United States Patent [19]

Shibuya et al.

[11] Patent Number: 5,162,435

[45] Date of Patent: Nov. 10, 1992

[54] RESIN COMPOSITION

[76] Inventors: Nobuhiro Shibuya, c/o Mitsubishi Petrochemical Co., Ltd. 1, Toho-cho, Yokkaichi-shi, Mie-ken; Takeyoshi Nishio, 55-39, Hosokawa-cho Kamiohhari, Okazaki-shi, Aichi-ken, both of Japan

[21] Appl. No.: 419,942

[22] Filed: Oct. 11, 1989

[30] Foreign Application Priority Data

Oct. 12, 1988 [JP] Japan .................. 63-254889

[51] Int. Cl.$^5$ .................. C08L 53/02; C08L 71/12
[52] U.S. Cl. .................. 525/68; 525/79; 525/80; 525/81; 525/92; 525/152; 525/902
[58] Field of Search .................. 525/132, 133, 92, 152, 525/905, 68, 79, 80, 81

[56] References Cited

U.S. PATENT DOCUMENTS 4,728,461  3/1988  Fujü et al. .................. 525/905

FOREIGN PATENT DOCUMENTS 0080666  6/1983  European Pat. Off. .
0229498  7/1987  European Pat. Off. .
0307802  3/1989  European Pat. Off. .............. 525/92

OTHER PUBLICATIONS

Patent Abstracts of Japan, vol. 12, No. 372, (C-533) (3219), Oct. 5, 1988.

Primary Examiner—Jacob Ziegler

[57] ABSTRACT

A resin composition comprising 20-77 wt. % of polyolefin (A), 20-77 wt. % of polyphenylene ether resin (B), 2-50 wt. % of polymer (C) combining alkenyl aromatic comound polymerization chain and aliphatic hydrocarbon chain in the same molecule, and 1-25 wt. % of ester group containing ethylene copolymer (D).

12 Claims, No Drawings

RESIN COMPOSITION

BACKGROUND OF THE INVENTION

This invention relates to a thermoplastic resin composition which can be used for molded product, sheet and the like prepared by injection molding, blow molding or the like, and more particularly to a thermoplastic resin composition comprising polyolefin, polyphenylene ether resin, a polymer combining polymerization chain of aromatic alkenyl compound and aliphatic hydrocarbon chain in a same molecule and exhibiting no elasticity at 23° C.; ester group containing ethylene copolymer composed of unsaturated ester compound of general formula (I) and olefin principally containing ethylene, along with having excellent mechanical properties such as high strength at welded area often caused by injection molding,

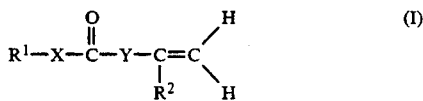

wherein, R1 represents a saturated hydrocarbon group with a carbon number of 1 to 50 and containing or not containing oxygen atom, an alicyclic hydrocarbon, or an aromatic hydrocarbon group wherein the bond between R1 and X is not oxygen atom, R2 represents a hydrogen atom or methyl group, and X and Y denote a combination in which either of X and Y is a direct bonding and the other is oxygen atom.

Polyolefines are excellent in molding properties, toughness, water resistance, organic solvent resistance, chemical resistance etc., and have low specific gravity as well as being economical, therefore, they have been widely used for a variety of molded products, film, sheet etc.

However, polyolefins have not generally so high heat resistance and stiffness that, it is desirable to improve these properties to develop novel applications.

On the other hand, polyphenylene ether resins have excellent heat resistance and stiffness, but have objections in molding properties and solvent resistance, resulting in limited application fields. In order to improve their molding properties and impact strength, polyphenylene ether resins are blended with styrene resins, however, such modified resins are poor in solvent resistance and limited in application region, for example, they are not suitable for the applications requiring oil solvent resistance such as gasoline storage vessels.

For purposes of combining the advantages of these polyolefins and polyphenylene ethers and improving their defects, a variety of blended compositions are proposed, for example, compositions for improving molding characteristics and tensile strength were proposed by Japanese Patent Publication No. 7069/1967, however, they may not necessarily satisfy relatively higher level of mechanical strength needed for industrial fields.

Further, for purposes of improving mechanical strength by means of better compatibility between polyolefin and polyphenylene ether resin, for example, compositions (Japanese Patent Laid-open No. 71158/1978, Japanese Patent Laid-open No. 88960/1979, Japanese Patent Laid-open No. 100159/1984 etc.) comprising block copolymer of styrene with butadiene or hydrogenated additive thereof compounded. In addition, compositions having these ingredients and inorganic fillers added (Japanese Patent Laid-open No. 103556/1983) and the like are proposed. Moreover, compositions are proposed which comprises polyphenylene ether resin and a large amount of polyolefin as much as more than 20 wt. %, as well as comprises materials having compatibilizing activity such as diblock or radialteleblock copolymers composed of alkenyl aromatic compounds and conjugated dienes, or hydrogenated polymers thereof added, (Japanese Patent Laid-open No. 103557/1983, Japanese Patent Laid-open No. 76547/1985) and it is shown that said compositions have an effect to improve melt processing tensile property, brittleness etc.

While, as for injection molding of thermoplastic resin, a method is often employed wherein molten resin is poured into a cavity of metal mold through plural gates of metal mold, then the resulted branched resin flows are put together between two gates for purposes of shortening the injection time required for large-sized product production and for compensating molten resin for its poor fluidity. And as for molding complicated configuration products (e.g. perforated product), a method is employed in which molten resin is branched at a baffle plate and put together again within a mold. However, in such cases, inevitably jointed areas (hereinafter, referred to simply as welds) are produced, which have been desired to be improved because of their often ocurring poor strength in a blending system mainly composed of the combinations of polyolefins and polyphenylene ether resins.

Considering said present conditions, this invention is intended to prepare resin compositions, containing polyolefins and polyphenylene ether resins, which combine favorable weld strength as well as balanced mechanical properties by means of developing novel compositions.

The present inventors investigated a variety of compounding components for improving the weld strength resulted from conventional polyolefin-polyphenylene ether compositions. As a result of the investigation, they discovered resin compositions, having favorable weld strength as well as relatively better mechanical strength at the unwelded area (herein after described as ordinary area), which comprises a polymer combining an alkenyl aromatic compound polymerization chain compound and aliphatic hydrocarbon chain, and having a dynamic shearing modulus of elasticity G' of at least $3\times10^8$ dyne/cm$^2$, and an ester group containing ethylene copolymer. Eventually this invention has been completed.

SUMMARY OF THE INVENTION

In other words, a resin composition according to this invention comprises 20–77 wt. % of polyolefin (A), 20–77 wt. % of polyphenylene ether resin (B), 2–50 wt. % of polymer (C) combining alkenyl aromatic compound polymerization chain (C1) and aliphatic hydrocarbon chain (C2) in the same molecule and having a dynamic shearing modulus of elasticity G' of at least $1\times10^8$ dyn/cm$^2$ at 23° C., and 1–25 wt. % of ester group containing ethylene copolymer (D) comprising 8–43 wt. % of unsaturated ester compound of general formula (I) and olefin comprising ethylene as principal components mixed.

According to this invention, a resin composition, having good weld strength and relatively better mechanical strength at ordinary areas compared with a conventional resin composition containing polyolefin and polyphenylene ether resins can be obtained.

DETAILED DESCRIPTION OF THE INVENTION

The resin compositions according to this invention are composed of the following ingredients.

1. Constituting Components

(1) polyolefin (A)

The polyolefins used in this invention are homopolymers and copolymers having the form of random or block copolymers which are alpha-olefins such as propylene, butene-1, pentene-1, hexene-1, 3-methylbutene-1, 4-methylpentene-1, heptene-1, octene-1 etc.; random, block, graft or the like copolymers composed of said alpha-olefins as main component and not more than 20 wt. % of ethylene; or halogenated, sulfonated or oxidized polymers thereof at least partially crystallized.

These polymers can be prepared by known polymerization or modification methods, or can be suitably selected from comercially available products.

Among these polymers, homopolymers of propylene, butene-1, 3-methylbutene-1 and 4-methylpentene-1, or copolymers composed of predominant quantity of said olefins are preferable, in particular, crystalline polypropylene type polymer, i.e., crystalline propylene momopolymer, crystalline propylene-ethylene block and random copolymers are preferable.

Further, among these, the compositions of this invention employing propylene-ethylene block or random copolymer, or propylene-ethylene-butene-1 block or random copolymer exhibiting crystallinity due to isotactic poly-propylene chain have a increasing tendency of weld strength, in particular, the compositions using propylene-ethylene block copolymer (2-15 wt. %, of, preferably 4-12 wt. % of ethylene) or propylene-ethylene-butene-1 block copolymer (1-13 wt. %, preferably 3-10 wt. % of ethylene, 0.5-10 wt. %, preferably 2-7 wt. % of butene) showing crystallinity due to isotactic polypropylene chain has a more increasing tendency of weld strength.

Furthermore, alpha-olefin rubbers containing predominant amounts of these crystalline propylene polymers and ethylene, i.e. plural types of alpha-olefins containing ethylene, and optionally mixtures of said propylene polymers with rubber-like copolymers containing small amounts of non-conjugated diene are preferable in the balance of mechanical properties. As for specifical examples of these alpha-olefin rubbers, ethylene-propylene copolymer rubber, ethylene-butene-1 copolymer rubber, ethylene-propylene-butene-1 copolymer rubber, ethylene-propylene-non-conjugated diene copolymer rubber etc. can be given.

The melt flow rate (MFR) (230° C., load: 2.16 kg) of said crystalline propylene polymers and the mixtures of said polymers and alpha-olefin rubbers is preferably in the range of 0.01-150 g/10 min., more preferably in the range of 0.05-70 g/10 min. particularly in the range of 0.1-50 g/10 min. and most preferably in the range of 0.5-30 g/10 min. When the value of MFR is over said range, the corresponding mechanical property balance level is low, and when below the range there are objections in molding properties, resulting in undesirable results.

(2) polyphenylene ether resin (B)

The polyphenylene ether resin used according to this invention has repeating structural unit of general formula,

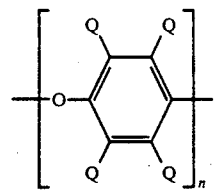

wherein, an ether-oxygen atom of one unit is connected to a benzene nucleus of the neighboring unit, n is at least 30, each of Q independently represents monovalent substituent selected from the group consisting of hydrogen, halogen, hydrocarbon group containing no tertiary cabon atom, halohydrocarbon group having at least 2 cabon atoms between halogen atom and phenyl nucleus, hydrocarbon oxy group and halohydrocarbon oxy group having at least 2 carbon atoms between halogen atom and phenyl group.

As for typical polyphenylene ether examples, poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylen)ether, poly(2,6-dibutyl-1,4-phenylene)ether, poly(2,6-di-propenyl-1,4-phenylene)ether, poly(2,6-dilauryl-1,4-phenylene)ether, poly(2,6-diphenyl-1,4-phenylene)ether, poly(2,6-dimethoxy-1,4-phenylene)ether, poly(2,6-diethoxy-1,4-phenylene)ether, poly(2-methoxy-6-ethoxy-1,4-phenylene)ether, poly(2-ethyl-6-stearyloxy-1,4-phenylene)ether, poly(2,6-dichloro-1,4-phenylene)ether, poly(2-methyl-6-phenyl-1,4-phenylene)ether, poly(2,6-dibenzyl-1,4-phenylene)ether, poly(2-ethoxy-1,4-phenylene)ether, poly(2-chloro-1,4-phenylene)ether, poly(2,5-dibromo-1,4-phenylene)ether and the like can be given.

Also copolymer of 2,6-dimethylphenol and 2,3,6-trimethylphenol, copolymer of 2,6-dimethylphenol and 2,3,5,6-tetramethylphenol, copolymer of 2,6-diethylphenol and 2,3,6-trimethylphenol, and the like copolymer can be given.

In addition, polyphenylene ethers used in this invention can include modified polyphenylene ethers obtained from the polyphenylene ethers, defined by said general formula, which are grafted with styrene monomers (e.g. styrene, p-methylstyrene, alpha-methylstyrene etc.), and blended with styrene resins.

The methods for manufacturing polyphenylene ethers corresponding to said ethers have been known, and disclosed, for example, by U.S. Pat. Nos. 3,306,874, 3,306,875, 3,257,357, and 3,257,358, and Japanese Patent Publication No. 17880/1977 and Japanese Patent Laid-open No. 51197/1975.

The groups of polyphenylene ethers preferable for the objects of this invention are the ethers having alkyl substituent groups at the two ortho positions to the position of the ether oxygen atom, polymers or copolymers of 2,6-dialkylphenol and 2,3,6-trialkylphenol.

Among these, particularly polymer of 2,6-dimethylphenol is preferable. And the preferable molecular weight thereof, expressed as a scale in intrinsic viscosity using chloroform at 30° C., ranges from 0.35 to 0.7 dl/g, preferably from 0.44 to 0.6 dl/g and more preferably from 0.48 to 0.56 dl/g. In less than 0.35 dl/g, corresponding products tend to have lower weld strength, and in more than 0.7 dl/g, the compositions are liable to have lower molding properties.

(3) polymer (C) combining alkenyl aromatic compound polymer chain (C1) and aliphatic hydrocarbon chain (C2) in a molecular chain A polymer (C) [hereinafter referred to as polymer (C)] combining alkenyl aromatic compound polymer chain (C1) [hereinafter referred to as chain (C1)] and aliphatic hydrocarbon chain (C2) [hereinafter referred to as chain (C2)] in the same molecular chain, which is used in this invention, is a polymer composed of polymer chains combining a polymerization chain part of alkenyl aromatic compound and a part forming aliphatic hydrocarbon polymerization chain at least one chain part for each in the same high molecular chains, and said polymer contains so-called linear block structure having at least one of chain (C1) and chain (C2) bonded each other linearly, so-called radial teleblock structure having branched structure, so-called graft branched structure having one chain as backbone and the other chain as branches.

Alkenyl aromatic compound forming chain (C1) has a chemical structure shown by the following general formula,

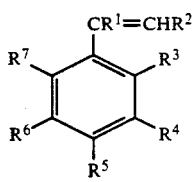

wherein R1 and R2 are selected from the group consisting of hydrogen and lower alkyl group or alkenyl group with a carbon number of 1-6, R3 and R4 are selected from the group consisting of hydrogen, lower alkyl group with a carbon number of 1-6, chlorine and bromine, R5, R6 and R7 are selected from the group consisting of hydrogen, lower alkyl group and alkenyl group with a carbon number of 1-6, or R6 and R7 constitute a part of aromatic ring, for example, they can form a naphthyl group.

As for concrete examples of alkenyl aromatic compound, styrene, p-methylstyrene, alpha-methylstyrene, vinylxylene, vinyltoluene, vinylnaphthalene, divinylbenzene, bromostyrene and chlorostyrene are given, and combinations of these may also be given. Among these, styrene, alpha-methylstyrene, p-methylstyrene, vinyltoluene and vinylxylene are preferable, and styrene is more preferable.

Chain (C1) can include other copolymer components than alkenyl aromatic compound, as far as the amount of the component does not exceed 25 inner percentage by weight based on the total quantity of said chain (C1) as 100 wt. %.

Chain (C2) is hydrocarbon chain containing saturated aliphatic hydrocarbon as main component, specifically, polymer chains of olefins or chemical compounds having a structure same as or similar to that of polymer of olefins obtained by saturating unsaturated carbon-carbon bond of the polymers of conjugated dienes by means of known hydrogenation method. The chain (C2) can partially contain carbon-carbon unsaturated bond, cross-linked structure and branched structure, also may contain other copolymerization components such as monomers having oxygen, nitrogen, sulfur, silicon, phosphorous, halogen atoms etc. other than carbon atom, and the components in the form of block, random, graft or the like structure originated from alkenyl aromatic compounds. as far as the amount thereof dose not exceed 25 inner percentage by weight based on the total quantity of said chain (C2) as 100 wt. %. As for monomer examples containing atoms other than carbon, maleic anhydride and its derivatives, acrylic acid and its derivatives, vinyl chloride can be given, The occupying rate of chain (C1) in the polymer (C), assuming the total weight of the polymer (C) to be 100 wt. %, is preferably in the range of 10 to 80 wt. % and more preferably in the range of 20 to 75 wt. %. The occupying rate of the chain (C2) is preferably in the range of 20 to 90 wt. % and more preferably in the range of 25 to 80 wt. %. The polymer (C) can contain copolymerization components and polymer chains other than chain (C1) and chain (C2), and the polymer chains can form the backbone and branches of branched chain, or can constitute a part of block chain. And at the branching points of branched and radial teleblock structures, they may also contain polyfunctional hydrocarbon group or atoms other than carbon, and polyfunctional hydrocarbon group having atoms other than carbon.

The polymer (C) used in this invention has a dynamic shearing modulus of elasticity G' at 23° C. of at least $3 \times 10^8$ dyn/cm$^2$, preferably $7 \times 10^8$ dyn/cm$^2$, more preferably $1 \times 10^9$ dyn/cm$^2$.

Dynamic shearing modulus of elasticity G' can be measured by means of a variety of commercially available viscoelasticity measuring apparatus, for example, Mechanical Spectrometer (Model No. RMS605: by Rheometrics Inc.) etc. can be given. Using such apparaus, the results obtained at the conditions of 23° C., a frequency of 1 Hz. a strain of 0.1-1.5% are defined as dynamic shearing modulus of elasticity G' values.

The polymer (C) is a material having properties quite different from those of natural rubber, polybutadiene rubber, butadiene-styrene copolymer, butadiene acrylonitrile copolymer, polyisobutylene, Thiokol rubber etc. which are known as rubber, and exhibit elastic properties at room temperatures e.g. 20° to 25° C. and also different from elastomer component generally used for objects improving impact strength and adding softness of thermoplastic resins.

The difference of properties between the polymer (C) of this invention and the materials generally known as rubber or elastomer can be determined by measuring and comparing the characteristics such as tensile strength, tensile modulus of elasticity, tensile elongation, torsional rigidity modulus etc., while in this invention said difference can be determined by dynamic shearing modulus of elasticity.

In order to prepare polymer having a dynamic shearing modulus of elasticity of at least $3 \times 10^8$ dyn/cm$^2$, it is necessary to carefully select the ratio of chain (C1) to chain (C2), binding method thereof, and their microstructures each (stereoregularity, the ratio of vinyl group, cis-1,4 bond and trans-1,4 bond when polydiene is employed).

The polymer (C) is not preferable, when the properties therof are in the range of those of rubber or elastomer, because corresponding resin compositions will have greatly decreased stiffness.

As for concrete examples of polymer (C), polystyrene grafted polypropylene, polystyrene grafted polyethylene, ethylene-styrene block copolymer, propylenestyrene block copolymer or alkenyl aromatic compound contained in the region of graft and block copolymers composed of olefin and alkenyl aromatic compound such as styrene etc., or partially hydrogenated block copolymer comprising alkenyl aromatic compound and cojugated diene described below, or partially hydrogenated graft copolymer which is obtained by grafting alkenyl aromatic compound to conjugated diene polymer rubber and polypentenamer etc. can be given, and among which partially hydrogenated block copolymer of alkenyl aromatic compound-conjugated diene is more preferable.

As for concrete examples of said conjugated diene, 1,3-butadiene, 2-methyl-1,3-butadiene, 2,3-dimethyl-1,3-butadiene, 1,3-pentadiene etc. are given, and among which 1,3-butadiene and 2-methyl-1,3-butadiene are preferably selected, and more preferably 1,3-butadiene is selected. These conjugated diene compounds can contain small amounts of lower olefin hydrocarbons such as ethylene, propylene, 1-butene etc., cyclopentadiene and non-conjugated dienes.

Hereinafter, partially hydrogenated alkenyl aromatic compound-conjugated diene block copolymer will be more particularly illustrated. "Partially hydrogenated alkenyl aromatic compound-conjugated diene block copolymer" comprising alkenyl aromatic compound-conjugated diene block copolymer with a structure having at least one of chain block "A" and chain block "B" originated from alkenyl aromatic compound and conjugated diene respectively, and said block copolymer having ethylenic carbon-carbon double bond of block B decreased by hydrogenation. The arrangement of blocks A and B may contain a linear structure or a branched structure so-called radial teleblock structure. And the structure can contain, as its part, random chain originated from the random copolymer part produced from lkenyl aromatic compound and conjugated diene. Among which, a linear structure of block copolymers are preferable. More preferably it is selected from the types of A-B-A and A-B.

As for partially hydrogenated alkenyl aromatic compound-conjugated diene block copolymer (C), for not permitting the properties thereof at 23° C. to be the properties as elastomer, the selection of the ratio of chain (C1) to chain (C2), and the microstructure of conjugated diene before hydrogenation in the chain (C), in particular, the selection of 1,2 bond or 3,4 bond, and cis- to trans-1,4 bonds ratio is important.

The rate of chain (C1), that is, the occupying rate of the repeating structural units originated from alkenyl aromatic compound preferably ranges from 55-80 wt. %, more preferably from 55-75 wt. %, and furthermore preferably from 55-65 wt. %. When said rate is less than 55 wt. %, polymer (C) has a tendency to exhibit elastic properties at 23° C. as well as the resin composition resulted tends to have a lower level of stiffness, and when more than 80 wt. %, corresponding compositions tend to have less impact strength.

The chain (C2) constituting partially hydrogenated alkenyl aromatic compound-conjugated diene block copolymer (C) is a hydrogenated diene polymer chain, and the molecular structure of chain (C2) after hydrogenation and the properties of copolymer (C) are greatly affected by the proportion of the sum of 1,2-binding and 3,4-binding to the microstructure (cis- and trans-1,4 bindings, and 1,2-binding and 3,4-binding) of the double bond in the diene polymer chain prior to hydrogenation.

The proportion of the sum of the parts originated from 1,2 bond and 3,4 bond to the hydrogenated chain (C2) are preferably in the range of 0 wt. % to 30 wt. %, more preferably 4 wt. % to 30 wt %, and furthermore preferably 8 wt. % to 27 wt %. In the range more than 30 wt %, the polymer (C) is liable to give elastic properties at 23° C., and the resin composition obtained has a tendency to have lower level of stiffness.

The share of the ethylenic carbon-carbon double bonds left unhydrogenated in the aliphatic chain parts of these block copolymers, is preferably not more than 10%, and more preferably not more than 4%. Also, about not more than 25% of the aromatic carbon-carbon double bonds originated from alkenyl aromatic compound may be hydrogenated.

As for molecular weight of these hydrogenated block copolymers (C2), a variety of types of molecular weight may be employed, as a guide for them, the values of number-average molecular weight, obtained by reduced polystyrene method using the data measured by gel permeation chromatography, are preferably in the range of 5,000 g/mol to 500,000 g/mol, more preferably 10,000 g/mol to 300,000 g/mol, furthermore preferably 30,000 g/mol to 200,000 g/mol, and exceptionally preferably 45,000 g/mol to 150,000 g/mol. When the values of number-average molecular weight based on the reduced polystyrene method are more than 500,000 g/mol and less than 5,000 g/mol, corresponding resin compositions tend to have discontented mechanical strength.

As for a method of preparing alkenyl aromatic compound-conjugated diene block copolymer, a variety of method have been proposed. As for typical methods, for example, Japanese Patent Publication No. 23798/1965, U.S. Pat. Nos. 3,595,942 and 4,090,996 disclosed methods wherein using Ziegler type catalyst or lithium catalyst, block copolymerization is carried out in inert solvent.

As for the hydrogenating treatment of these block copolymers, said treatment is conducted in inert solvent by hydrogenation in the presence of hydrogenation catalyst. In such hydrogenation, at least 85%, preferably not less than 96% of olefin type double bond in polymer block B, and not more than 25% of aromatic unsaturated bond in polymer block A may be hydrogenated according to the methods described by each patent specification of Japanese Patent Publication Nos. 8704/1967, 6636/1968, 20814/1971 etc.

In addition, according to the methods shown in the literature (Journal of Polymer Science) Part B Letters Volume 11, p.p. 427–434 (1973), the hydrogenation can be performed in inert solvent using p-toluenesulfonyl hydrazide or the like.

(4) ester group containing ethylene copolymer (D)

The ester group containing ethylene copolymer (D) is a copolymer comprising ethylene or ethylene as principal component, and unsaturated ester compound of the next general formula (I)

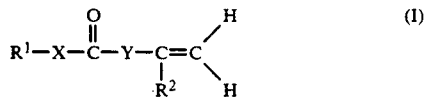

(I)

wherein R1 represents a saturated hydrocarbon group having a carbon number of 1 to 50 and containing or not containing oxygen atom, alicyclic hydrocarbon group, or aromatic hydrocarbon group; R2 represents hydrogen atom or methyl group; and X and Y denote a combination in which either of X and Y is direct bond and the other is oxygen atom.

The carbon number of R1 ranges preferably from 1 to 30, and more preferably from 1 to 20.

The concrete examples of R1 are as follows: methyl group. ethyl group, propyl group, isopropyl group, butyl group, isobutyl group, t-butyl group, pentyl group, hexyl group, 2-ethylhexyl group, octyl group, lauryl group, palmityl group, stearyl group, cyclopentyl group, cyclohexyl group, 4-methylcyclohexyl group, mentyl group, 2-norbornyl group, 3-norbornyl group, phenyl group, p-tolyl group, xylyl group, 2-naphthyl group, benzyl group, 2-phenylethyl group, 2-hydroxyethyl group, 4-hydroxybutyl group, methoxymethyl group, 2-methoxyethyl group, 2-butoxyethyl group, 4-methoxyphenyl group, 2-acetoxyethyl group, glycidyl group, 2,3-epoxybutyl group, 2,3-epoxy-2-methylpropyl group and the like. Then, the part where R1 binds to X does not contain a compound to become oxygen atom, therefore, cannot form peracid ester.

As for concrete examples of the unsaturated ester compounds used by this invention, methyl acrylate, ethyl acrylate, propyl acrylate, butyl acrylate, hexyl acrylate, 2-ethylhexyl acrylate, octyl acrylate, lauryl acrylate, stearyl acrylate, cyclohexyl acrylate, benzyl acrylate, 2-phenylethyl acrylate, 2-hydroxyethyl acrylate, 2-methoxyethyl acrylate, unsaturated glycidyl ester such as glycidyl acrylate etc., acryl ester such as 2,3-epoxy-2-methylpropyl acrylate, methacrylate ester which is an ester having not acrylic acid but methacrylic acid in place of the acid moiety in said acrylates, vinyl esters such as vinyl acetate, vinyl propionate, vinyl butylate, vinyl hexanoate, vinyl octanoate, vinyl laurate, vinyl stearate, vinyl phenylacetate etc., 2-propenylester which is an ester having not vinyl group but 2-propenyl group in place of the unsaturated hydrocarbon moiety in said vinyl esters and the like can be shown.

Among these unsaturated esters, methyl acrylate, ethyl acrylate, methyl methacrylate, ethyl methacrylate, vinyl acetate, vinyl propionate, glycidyl acrylate and glycidyl methacrylate are preferable, vinyl acetate and glycidyl acrylate are more preferable.

Said unsaturated ester compounds may be used either alone or together.

Polyethylene not containing said unsaturated ester compounds as copolymer component, or polyethylene obtained by copolymerization of copolymer component with no ester group, for example, acrylic acid and methacrylic acid will provide corresponding resin compositions with undesirable level of weld strength.

As for monomer components constituting ester group containing ethylene copolymer (D), besides said ethylene and unsaturated ester compound, olefins such as propylene, 1-butene, 1-hexene etc., within the range not exceeding about 1/10 amount of the ethylene, can be contained.

The share of unsaturated ester compound (d1) in the ester group containing copolymer (D) is preferably 8 to 43 wt. %, more preferably 12 to 33 wt. %, and furthermore preferably 15 to 30 wt. %. In the range of less than 8 wt. % and more than 43 wt %, the resin compositions obtained tend to have lower level of weld strength.

As for bonding manners of unsaturated ester compound, ethylene-olefin or vinyl compound, block type, random type, graft type and the like can be given, each of which may be used, and random type may be easily used.

With respect to the molecular weight (or polymerization degree) of ester group containing ethylene copolymer (D), a variety of molecular weight can be employed. Preferable range of molecular weight of the copolymer (D), expressed in melt flow rate value (according to JIS K7210-1975) being one of the guides for molecular weight), ranges from from 0.001 to 1000 g/10 min., more preferably from 0.01 to 100 g/10 min., furthermore preferably from 0.1 to 50 g/10 min., and exceptionally preferably 1-20 g/10 min. In the range of more than 1000 g/10 min. and less than 0.001 g/10 min. the resin compositions obtained tend to have lower level of mechanical strength and weld strength.

The ester group containing olefin copolymer (D) can be prepared by a variety of methods. For example, a method in which unsaturated ester compound and ethylene, optionally olefins other than ethylene being added, are contacted in the presence of free-radical initiator at 50–4000 atm. and 40°–300° C., a method in which unsaturated ester compound is added to and mixed with polyethylene, and gamma rays are directed to the mixture under high vacuum to produce polymer, or a method of preparing polymer by reacting polyethylene and unsaturated ester compound in organic solvent such as xylene etc. and in the presence of free-radical initiator can be given.

2. Composition ratio of components

The proportion of each polmer components in the compositions by this invention is shown below based on the sum of polyolefin (A), polyphenylene ether resin (B), polymer (C) combining alkenyl aromatic hydrocarbon polymer chain (C1) and aliphatic hydrocarbon chain (C2) in a same molecular chain, and ester group containing ethylene copolymer (D) as 100 wt. %.

Polyolefin (A): the proportion thereof ranges as follows:
20–77 wt. %,
preferably 25–60 wt. %,
more preferably 30–55 wt. %,
furthermore preferably 30–50 wt. %.

In less than 20 wt. %, and in more than 77 wt. %, it is liable to have undesirable organic solvent resistance and poor heat resistance concerning stiffness respectively.

Polyphenylene ether (B): the proportion thereof ranges as follows:
20–77 wt. %,
preferably 25–60 wt. %,
more preferably 30–55 wt. %,
furthermore preferably 30–50 wt. %.

In less than 20 wt. %, and in more than 77 wt. %, it tends to have undesirable level of stiffness at higher temperature, and have objections in solvent resistance and molding properties respectively.

Polymer (C) which combines alkenyl aromatic compound polymerization chain (C1) and aliphatic hydrocarbon chain (C2) in a same molecule: the proportion of polymer (C) ranges as follows:

2-50 wt. %,
preferably 6-30 wt. %,
more preferably 8-25 wt. %,
furthermore preferably 10-20 wt. %.

In less than 2 wt. %, it tends to have poor weld strength and impact resistance at ordinary part of corresponding composition, and in more than 50 wt. %, it is liable to have lower solvent resistance.

Ester group containing copolymer (D): the proportion thereof ranges as follows:

1-25 wt. %,
preferably 2-20 wt. %,
more preferably 3-18 wt. %,
furthermore preferably 4-15 wt. %.

In less than 1 wt. %, it tends to have undesirable weld strength and in more than 25 wt. %, it tends to have lower rigidity of corresponding compositions.

Configuration of Constituent

As for the resin compositions of this invention, the control of higher-order of resin composition configuration produced by its components is also important.

In this invention, it is preferable that polyolefin (A) forms continuous phase and polyphenylene ether resin (B) forms independent dispersion phase. Polyolefin (A) forming continuous phase can provide better solvent resistance. As for polymer (C) which combines alkenyl aromatic compound polymerization chain (C1) and aliphatic hydrocarbon chain (C2) in the same molecule and has a dynamic shearing modulus of elasticity of not less than $1 \times 10^8$ dyne/cm$^2$, it is preferable for the polymer (C) to be in the vicinity of the interface between polyolefin (A) and polyphenylene ether (B), and to act as a compatibilizing agent. In the absence of polymer (C) at and near the interface, corresponding resin compositions are likely to have insufficient mechanical strength.

It is preferable that ester group containing ethylene copolymer (D) is at least partly in the dispersion phase of polyphenylene ether (B). For obtaining a higher level of weld strength of resin composition, preferably not less than about 50 wt. % of copolymer (D) exists in polyphenylene ether (B) phase, more preferably 70 wt. %, and, in particular preferably 90 wt. %.

The dispersion phase of polyphenylene ether can take a variety of configurations caused by the shearing action during molding, for examples, sphere or ellipsoid being an orientated sphere in one direction, and disklike body being an orientated sphere in two directions, and the like can be given. As for the size of these dispersion phases, the average length of the longest parts preferably range from 0.01 μm to 15 μm, and most preferably from 0.1 μm to 7 μm.

When the length is greater than said ranges, the resin compositions tend to have a lower level of impact strength, and when smaller than said ranges, these phases hardly receive concentrated stresses, therefore, are not liable to contribute to the improvement of impact strength.

As for dispersed polyphenylene ether phase, the ratio of the longest part to the shortest part of the phase can take various values, however, it ranges preferably not more than 50/1, more preferably not more than 20/1, and exceptionally preferably 10/1. When the ratio is smaller, a higher level of weld strength is apt to be obtained in the corresponding resin compositions.

The configuration of this dispersion phase can be observed with an electron microscope by the examination of the skin of injection molded product, The copolymer (D) in the dispersion phase of polyphenylene ether (B) can make a variety of forms according to the mixing method and condition, and the molding method and condition for each component, such as for example, particle, network etc. can be shown. As for particle, the size thereof can vary widely within the range not exceeding the sizes of polyphenylene ether dispersion phases, e.g., the upper and the lower limit lengths at major axis of the particle are about 2.2 μm and 0.005 μm respectively.

The size of dispersion phase of copolymer (D) affects the falling weight impact strength of plate-like product of resin composition, generally the smaller the size of dispersion phase of copolymer (D), the higher the falling weight impact strength.

These higher-order configuration structures can be observed with a transmission electron microscope, e.g., Model JEM-100CX (made by Japan Electron Optics Laboratory Co., Ltd.) etc. using the specimen prepared by cutting out a part of pellet or molded product of resin composition, staining the piece with osumium tetraoxide, ruthenium tetraoxide etc., and then preparing ultra thin cut pieces.

The staining permits the selective dyeing of each polymer in resin composition with the result of photographic identification, and the existing states of said copolymers can be confirmed.

As for the technique to achieve such configurations, it can be determined by considering the following conditions such as, (1) Chemical structure of each ingredient.
(2) Molecular weight of each ingredient.
(3) Blending method.
(4) Blending conditions (melt-blending).
(5) Various type of addition agents.

These techniques can be separately illustrated and are free from limitations.

The resin compositions according to this invention, within the range of not imparing the objects of this invention, can contain the following components, such as, thermoplastic or thermosetting resins other than said polmer components, rubber components, antioxidant, weathering agent, nucleus-forming agent, slip agent, inorganic and organic fillers and reinforcing agent, fire retardant, a variety of colorants, antistatic agent, mold releasing agent, small amount of free-radical initiator (organic peroxide, azo-compound, organic tin compound etc.) for molecular weight modifying of polyolefin, and the like.

3. Blending method

As for blending methods for preparing the resin compositions according to this invention, various methods of blending different resin together; resin stabilizer and colorants together; and resin and filler together can be employed. For example, each component in the form of powder or pellet can be blended by Henschel mixer, Super mixer, ribbon blender, twin-cylinder mixer etc. to form homogeneously dispersed mixture, subsequently the mixture can be melt-mixed by twin-screw extruder, single-screw extruder, roller, Banbury mixer. plastomill, Brabender Plastograph etc. The melt-mixing temperature usually ranges from 200° C. to 350° C.

A kneading method, wherein using a single- or twin-screw extruder equipped with plural raw material feeding devices at different positions of the resin melt-kneading area of the extruder, and then at least one type of, or a part of the polymer components of (A), (B), (C) and (D) of this invention, are fed through said different positions, and then successively kneaded to produce resin composition, a kneading method wherein using plural kneaders, at least one component of said polymer components is mixed with other components at molten state, a mixing method wherein at least two types of said polymer components are mixed together with the use of common solvent to make a state of solution or slurry, and the other various mixing/kneading methods can be employed.

The resin composititios obtained as described above can be made into pellets by extruding the compositions after melt-kneading.

4. Applications of the resin compositions by this invention.

The resin compositions by this invention are suitable, because of their excellent mechanical properties, for interior and exterior parts of automobiles, exterior parts of electrical apparatus and part applications for so-called office-automation apparatus etc. As for molding methods, general molding methods applied to thermoplastic resins, injection molding, extrusion molding, blow molding or the like is suitable for easy production of plastic parts. In particular, injection molding is most preferable.

In particular, the resin copmpositions of this invention are suitable for preparing parts liable to have welds by injection molding.

In the following, this invention will be more specifically illustrated with reference examples.

EXAMPLE

1. Details of each component 1) polyolefin (A)

Polypropylene homopolymer, propylene-ethylene block copolymer supplied by Mitsubishi Petrochemical Co., Ltd. were used. MFR and ethylene component content are given in the table below.

The ethylene component content of polyolefin was obtained by infrared spectroscopic analysis.

2) Polyphenylene ether resin (B)

Poly(2,6-dimethyl-1,4-phenylene)ether (having an intrinsic viscosity of 0.52 dl/g, measured with chloroform at 30° C.), a trial product by Mitsubishi Petrochemical Co., Ltd., was employed.

3) Polymer (C) combining alkenyl aromatic compound polymerization chain (C1) and aliphatic hydrocarbon chain (C2) in the same molecule.

Hydrogenated styrene-butadiene block copolymer was employed, which was synthesized according to the method described below.

(Synthesis of abbreviation HSB-1)

Commercially available styrene-butadiene block copolymer [copolymerization styrene content: 60 wt. %, trade name: TR2400, made by Nippon Synthetic Rubber Co., Ltd.] was well dried, and dissolved into well-moisture removed cyclohexane contained in a well-nitrogen displaced autoclave, then hydrogenation was conducted in the presence of nickel naphthenate catalyst. at 60°–70° C. and under 10–13 kg/cm² of hydrogen pressure for 9 hours. To the reaction solution was added a poor solvent (methanol), then the solvent and polymer were separated by filtration, and dried under reduced pressure to produce partially hydrogenated styrene-butadiene block copolymer.

(Synthesis of abbreviation HSB-2)

In an autoclave well displaced with nitrogen, using well-moisture removed cyclohexane as a solvent, styrene was polymerized in the presence of normal butyl lithium containing small amount of tetrahydrofuran at temperatures of about 60°–80° C., subsequently by adding butadiene solution, polybutadiene block chain bonded to polystyrene chain was polymerized, and then by adding styrene solution, polystyrene block chain bonded to polybutadiene chain was polymerized to produce styrene-butadiene block copolymer containing 60 wt. % of styrene block chain.

This styrene-butadiene block copolymer was hydrogenated according to the same method as in the hydrogenation treatment employed for the synthesis of said HSB-1 to obtain partially hydrogenated styrene-butadiene block copolymer.

The data of dynamic shearing modulus of elasticity and other analytical values of HSB-1, HSB-2 and commercially available partially hydrogenated styrene-butadiene block copolymer (trade name: Kraton G1652 and Kraton G1650 manufactured by Shell Chemical Co.) for comparison control are given in Table 1. Analysis by a conventional nuclear magnetic resonance spectroscopic method detected no carbon-carbon double-bonds originated from polybutadiene chain.

Styrene copolymerization content, and the proportions of 1,2 bond originated part and 1,4 bond originated part of polybutadiene were measured by 13C-NMR (nuclear magnetic resonance spectroscopic method of carbon isotope with a mass number of 13).

Number-average molecular weight was obtained as polystyrene reduced value using a gel permeation chromatography.

Dynamic shearing modulus of elasticity of G' was measured using Mechanical Spectrometer (Model No. RMS605) by Rheometrics Inc. under a temperature of 23° C., a frequency of 1 Hz. and strains from 0.1 to 1.5%.

4) Ester group containing ethylene copolymer (D)

Into a general autoclave type of polyethylene manufacturing apparatus, were introduced ethylene monomer compressed to a pressure of 2000 kg/cm², a given amount of unsaturated ester compound and together with initiator (di-t-butyl peroxide) then the mixture was block polymerized for several minutes kept at temperatures of 150°–300° C. with stirring, then the copolymer (D) produced was separated and taken out through a separator, then extruded in strands, and cut by a cutter to produce pellets.

In addition, commercially available ethylenevinylacetate copolymer (Trade name: Mitsubisi Polyethylene-EVA, made by Mitsubishi Petrochemical Co., Ltd., Trade name: Evaflex, made by Mitsui-DuPont Polychemicals Co., Ltd.), ethylene-ethyl acrylate copolymer and ethylene-methyl acrylate copolymer (Trade name: Yukalon-EEA and Yukalon-EMA, made by Mitsubishi Petrochemical Co., Ltd.), ethyleneglycidyl acrylate-vinylacetate copolymer and ethyleneglycidyl acrylate-copolymer (Trade name: Bond Fast-2B and Bond Fast-2E, made by Sumitomo Chemical Co., Ltd.) were used. The detail of each sample is shown in Table 2. The vinyl acetate copolymerization amount in ethylene-vinyl acetate copolymer and ethylene-vinyl propionate copolymerization amount in Table 2 are the values measured by saponification method, and the polymerization amounts of other unsaturated polyester compounds were measured by infrared spectroscopic analysis.

In addition, for purposes of comparison control, commercially available low-density polyethylene [abbreviation: LDPE, MFR: 4.0 g/10 min., density: 0.920 g/cm$^3$, trade nane: Mitsubishi Polyethylene YK-30 made by Mitsubishi Petrochemical Co., Ltd.] and ethylene-acrylic acid copolymer [abbreviation: EAA, MFR: 7 g/10 min., : copolymerization amount of acrylic acid: 8.5 wt. %. trade name: Yukalon-EAA A-220M, by Mitsubishi Petrochemical Co., Ltd.] were used. The acrylic acid copolymerization amount of ethylene-acrylic acid copolymer is the value obtained by means of neutralization method.

2. Mixing and kneading of resin composition

After specified amounts of the components shown in Table 2 and Table 3 were fully mixed and agitated by a Super mixer, and the mixture was melt-kneaded at 280° C. using TEX twin-screw extruder made by The Japan Steel Works Ltd., to produce composition. Then the composition was extruded in strands, and then cut into pellets.

When kneading said components, were kneaded, 0.3 part by weight of trade name Irganox 1010 (made by Ciba Geigy) and trade name Cyanox S1790 (made by American Cyanamid Co.) each as phenolic stabilizing agent, and 0.3 parts by weight (as outer parts based on the total amount of the polymer components as 100 parts by weight) of P-EPQ (Sandoz Corp.) as phosphoric stabilizing agent were added.

3. Preparation of specimens for measuring and evaluating physical properties

Using inline screw type injection machine, type IS-90B made by Toshiba Machine Co., Ltd., and presetting cylinder temperature at 280° C., specimens were injection-molded at a mold cooling temperature of 60° C.

Specimens for measuring weld strength were prepared, which comprises a dimension of length 64 mm, width 12.5 mm and thickness 4 mm; and weld made at the central part of the each specimen.

In FIG. 1, resin is introduced through the pouring hole 1 in the center of the mold, then branches and flows through the runners 2 and 3 in the direction of the arrow, the branched resin flow from the opposite direction into the cavities for specimens 4, 5, 6, and 7, and join together at central area.

4. Measuring and evaluating methods

According to the following condition, weld strength, Izod impact strength and flexural modulus were measured and evaluated.

1) Weld strength

Using said specimens, not notched, for measuring weld strength, Izod impact test was conducted to obtain impact strength data. The measuring atmosphere temperature was 23° C.

2) Izod impact strength

According to ISO R180-1969 (JIS J7110)(notched Izod impact strength), said strength was measured by use of an Izod impact tester made by Toyo Seiki Seisakusho. The measuring atmosphere temperatures were 23° C. and −30° C.

3) Flexural modulus

According to ISO R178-1974 Procedure 12 (JIS K7203) said modulus was measured by use of Instron tester.

As for the compositions according to this invention and the comparison compositions, the type and quantity of their components and the physical properties thereof are summarized in Table 3 through Table 7.

TABLE 1

Details of polymer (C), used in examples, which combines alkenyl aromatic compound polymerization chain and aliphatic hydrocarbon chain in the same molecule.

| Abbreviation | | HSB-1 | HSB-2 | G1652 | G1650 |
|---|---|---|---|---|---|
| Type | | hydrogenated styrene-butadiene block copolymer | the same as left | the same as left | the same as left |
| Dynamic shearing modulus of elasticity | dyn/cm$^2$ | $4 \times 10^9$ | $3.5 \times 10^9$ | $1.2 \times 10^8$ | $1.5 \times 10^8$ |
| Styrene copolymerization amount | wt. % | 60 | 60 | 29 | 28 |
| Microstructure of hydrogenated polybutadiene | | | | | |
| Part of 1, 2 bond origin | wt. % | 14.3 | 25.1 | 41.8 | 37.0 |
| Part of 1, 4 bond origin | wt. % | 85.7 | 74.9 | 58.2 | 63.0 |
| Polystyrene reduced number-average molecular weight | g/mol | $8.1 \times 10^4$ | $8.5 \times 10^4$ | $5.7 \times 10^4$ | $8.1 \times 10^4$ |
| Trade name | | trial product by Mitsubishi Petrochemical Co., Ltd. | the same as left | Kraton G1652 [Shell Chemical Co.] | Kraton G1650 [the same as left] |

TABLE 2

Details of copolymer (D) employed in examples

| abbreviation of copolymer (D) | type of olefin component (principal component) | type of unsaturated ester compound | copolymerization amount of the left wt. % | melt flow rate of copolymer (D) (190° C., 2.16 kg) g/10 min. | trade name of copolymer (D) | |
|---|---|---|---|---|---|---|
| D1 | ethylene | vinyl acetate | 14 | 15 | Mitsubishi Polyethy-EVA V301S | Mitsubishi Petro-chemical Co., Ltd. |
| D2 | " | " | 25 | 2 | Mitsubishi Polyethy-EVA V505 | Mitsubishi Petro-chemical Co., Ltd. |
| D3 | " | " | 33 | 1 | Evaflex EV-170 | Mitsui-Dupont Polychemicals Co., Ltd. |
| D4 | " | " | 41 | 2 | Evaflex EV-40LX | Mitsui-Dupont Polychemicals Co., Ltd. |
| D5 | " | vinyl propionate | 25 | 2.5 | traial product by Mitsubishi Petrochemical Co., Ltd. | Mitsubishi Petro-chemical Co., Ltd. |
| D6 | " | vinyl acetate | 5 | 3 | Mitsubishi Polyeth-EVA V213K | Mitsubishi Petro-chemical Co., Ltd. |
| D7 | " | " | 46 | 2.5 | Evaflex EV-45LX | Mitsui-Dupont Polychemicals Co., Ltd. |
| D8 | " | methyl acrylate | 10 | 7 | Yukalon EMA XG-200M | Mitsubishi Petro-chemical Co., Ltd. |
| D9 | " | " | 13 | 0.4 | Yukalon EMA XG-300E | Mitsubishi Petro-chemical Co., Ltd. |
| D10 | " | " | 25 | 20 | Yukalon EMA XG-600S | Mitsubishi Petro-chemical Co., Ltd. |
| D11 | " | ethyl acrylate | 25 | 5 | Yukalon EAA C-500K | Mitsubishi Petro-chemical Co., Ltd. |
| D12 | " | methyl methacrylate | 22 | 4 | traial product by Mitsubishi Petrochemical Co., Ltd. | Mitsubishi Petro-chemical Co., Ltd. |
| D13 | " | ethyl acrylate | 45 | 26 | traial product by Mitsubishi Petrochemical Co., Ltd. | Mitsubishi Petro-chemical Co., Ltd. |
| D14 | " | glycidyl methacrylate / vinyl acetate | 10 / 7 | 3 | Bond Fast-2B | Sumitomo Chemical Co., Ltd. |
| D15 | " | glycidyl methacrylate | 10 | 2.5 | Bond Fast-E | Sumitomo Chemical Co., Ltd. |
| D16 | " | glycidyl methacrylate / ethyl acrylate | 16.4 / 12.3 | 10 | traial product by Mitsubishi Petrochemical Co., Ltd. | Mitsubishi Petro-chemical Co., Ltd. |

TABLE 3

| Item | unit | Example 1 | Example 2 | Example 3 | Example 4 | Example 5 | comparison Example 1 |
|---|---|---|---|---|---|---|---|
| [Formulation component] | | | | | | | |
| Polyolefin (A) | — | propyrene-ethylene block copolymer | the same as left | the same as left | the same as left | the same as left | the same as left |
| MFR of polyolefin (A) | g/10 min. | 2.5 | 2.5 | 2.5 | 2.5 | 2.5 | 2.5 |
| Ethylene component content of polyolefin (A) | wt. % | 11.8 | 11.8 | 11.8 | 11.8 | 11.8 | 11.8 |
| Formulation amount of polyolefin (A) | wt. % | 38.5 | 38.5 | 38.5 | 38.5 | 38.5 | 41.65 |
| Formulation amount of polyphenylene ether (B) | wt. % | 38.5 | 38.5 | 38.5 | 38.5 | 38.5 | 41.65 |
| Abbreviation of polymer (C) combining alkenyl aromatic compound polymerization chain and aliphatic hydrocarbon chain in the same molecule | | HSB-1 | HSB-1 | HSB-1 | HSB-1 | HSB-1 | HSB-1 |
| Dynamic shearing modulus of elasticity G' of (C) at 23° C. | dyn/cm$^2$ | 4 × 10$^9$ | 4 × 10$^9$ | 4 × 10$^9$ | 4 × 10$^9$ | 4 × 10$^9$ | 4 × 10$^9$ |
| Formulation amount of (C) | wt. % | 15 | 15 | 15 | 15 | 15 | 16.7 |
| Abbreviation of ester group containing ethylene copolymer (D) | — | (D1) | (D2) | (D3) | (D4) | (D5) | — |
| Type of unsaturated ester compound copolymerized with (D) (I) | — | vinyl acetate | vinyl acetate | vinyl acetate | vinyl acetate | vinyl propionate | — |
| Content of unsaturated ester compound copolymerized with (D) (I) | wt. % | 14 | 25 | 33 | 41 | 25 | — |
| Type of unsaturated ester compound copolymerized with (D) (II) | — | — | — | — | — | — | — |
| Content of unsaturated ester compound copolymerized with (D) (II) | wt. % | — | — | — | — | — | — |
| Melt flow rate of (D), 190° C., load: 2.16 kg | g/10 min. | 15 | 2 | 1 | 2 | 2.5 | — |

TABLE 3-continued

| | | | | | | | |
|---|---|---|---|---|---|---|---|
| Formulation amount of (D) | wt. % | 8 | 8 | 8 | 8 | 8 | — |
| [Properties of composition] | | | | | | | |
| Unnotched Izod impact strength at welded area at 23° C. | kg · cm/cm | 19.8 | 22.9 | 22.5 | 18.8 | 23.0 | 9.4 |
| Notched Izod impact strength at ordinary area at 23° C. | kg · cm/cm | 29.1 | 27.7 | 29.4 | 23.4 | 27.8 | 12.7 |
| −30° C. | kg · cm/cm | 10.4 | 10.3 | 9.7 | 7.8 | 10.0 | 7.7 |

| Item | unit | comparison Example 2 | comparison Example 3 | comparison Example 4 |
|---|---|---|---|---|
| [Formulation component] | | | | |
| Polyolefin (A) | — | the same as left | the same as left | the same as left |
| MFR of polyolefin (A) | g/10 min. | 2.5 | 2.5 | 2.5 |
| Ethylene component content of polyolefin (A) | wt. % | 11.8 | 11.8 | 11.8 |
| Formulation amount of polyolefin (A) | wt. % | 45.45 | 38.5 | 38.5 |
| Formulation amount of polyphenylene ether (B) | wt. % | 45.45 | 38.5 | 38.5 |
| Abbreviation of polymer (C) combining alkenyl aromatic compound polymerization chain and aliphatic hydrocarbon chain in the same molecule | | — | HSB-1 | HSB-1 |
| Dynamic shearing modulus of elasticity G' of (C) at 23° C. | dyn/cm$^2$ | — | $4 \times 10^9$ | $4 \times 10^9$ |
| Formulation amount of (C) | wt. % | — | 15 | 15 |
| Abbreviation of ester group containing ethylene copolymer (D) | — | (D2) | (D6) | (D7) |
| Type of unsaturated ester compound copolymerized with (D) (I) | — | vinyl acetate | vinyl acetate | vinyl acetate |
| Content of unsaturated ester compound copolymerized with (D) (I) | wt. % | 25 | 5 | 46 |
| Type of unsaturated ester compound copolymerized with (D) (II) | — | — | — | — |
| Content of unsaturated ester compound copolymerized with (D) (II) | wt. % | — | — | — |
| Melt flow rate of (D), 190° C., load: 2.16 kg | g/10 min. | 2 | 3 | 2.5 |
| Formulation amount of (D) | wt. % | 9.1 | 8 | 8 |
| [Properties of composition] | | | | |
| Unnotched Izod impact strength at welded area at 23° C. | kg · cm/cm | 3.4 | 11.7 | 12.3 |
| Notched Izod impact strength at ordinary area at 23° C. | kg · cm/cm | 2.5 | 28.9 | 19.4 |
| −30° C. | kg · cm/cm | 1.3 | 9.5 | 6.1 |

TABLE 4

| Item | unit | Example 6 | Example 7 | Example 8 | Example 9 | Example 10 | Comparison Example 5 |
|---|---|---|---|---|---|---|---|
| [Formulation component] | | | | | | | |
| Polyolefin (A) | — | propyrene-ethylene block copolymer | the same as left | the same as left | the same as left | the same as left | the same as left |
| MFR of polyolefin (A) | g/10 min. | 2.5 | 2.5 | 2.5 | 2.5 | 2.5 | 2.5 |
| Ethylene component content of polyolefin (A) | wt. % | 11.8 | 11.8 | 11.8 | 11.8 | 11.8 | 11.8 |
| Formulation amount of polyolefin (A) | wt. % | 38.5 | 38.5 | 38.5 | 38.5 | 38.5 | 45.45 |
| Formulation amount of polyphenylene ether (B) | wt. % | 38.5 | 38.5 | 38.5 | 38.5 | 38.5 | 45.45 |
| Abbreviation of polymer (C) combining alkenyl aromatic compound polymerization chain and aliphatic hydrocarbon chain in the same molecule | | HSB-1 | HSB-1 | HSB-1 | HSB-1 | HSB-1 | — |
| Dynamic shearing modulus of elasticity G' of (C) at 23° C. | dyn/cm$^2$ | $4 \times 10^9$ | $4 \times 10^9$ | $4 \times 10^9$ | $4 \times 10^9$ | $4 \times 10^9$ | — |
| Formulation amount of (C) | wt. % | 15 | 15 | 15 | 15 | 15 | — |
| Abbreviation of ester group containing ethylene copolymer (D) | — | (D8) | (D9) | (D10) | (D11) | (D12) | (D11) |
| Type of unsaturated ester compound ethylene copolymer (D) | — | methyl acrylate | methyl acrylate | methyl acrylate | ethyl acrylate | methyl methacrylate | ethyl acrylate |
| Content of unsaturated ester compound copolymerized with (D) | wt. % | 10 | 13 | 25 | 25 | 22 | 25 |
| Melt flow rate of (D), 190° C., load: 2.16 kg | g/10 min. | 7 | 0.4 | 20 | 5 | 4 | 5 |
| Formulation amount of (D) | wt. % | 8 | 8 | 8 | 8 | 8 | 9.1 |
| [Properties of composition] | | | | | | | |

TABLE 4-continued

| | | | | | | | |
|---|---|---|---|---|---|---|---|
| Unnotched Izod impact strength that welded area at 23° C. | kg · cm/cm | 15.8 | 17.2 | 15.9 | 17.8 | 17.6 | 3.6 |
| Notched Izod impact strength at ordinary area at 23° C. | kg · cm/cm | 34.1 | 34.9 | 31.5 | 34.1 | 34.0 | 2.8 |
| −30° C. | kg · cm/cm | 9.3 | 12.0 | 10.4 | 11.9 | 11.5 | 1.4 |

| Item | unit | Comparison Example 6 | Comparison Example 7 | Comparison Example 8 |
|---|---|---|---|---|
| [Formulation component] | | | | |
| Polyolefin (A) | — | the same as left | the same as left | the same as left |
| MFR of polyolefin (A) | g/10 min. | 2.5 | 2.5 | 2.5 |
| Ethylene component content of polyolefin (A) | wt. % | 11.8 | 11.8 | 11.8 |
| Formulation amount of polyolefin (A) | wt. % | 38.5 | 38.5 | 38.5 |
| Formulation amount of polyphenylene ether (B) | wt. % | 38.5 | 38.5 | 38.5 |
| Abbreviation of polymer (C) combining alkenyl aromatic compound polymerization chain and aliphatic hydrocarbon chain in the same molecule | | HSB-1 | HSB-1 | HSB-1 |
| Dynamic shearing modulus of elasticity G' of (C) at 23° C. | dyn/cm$^2$ | $4 \times 10^9$ | $4 \times 10^9$ | $4 \times 10^9$ |
| Formulation amount of (C) | wt. % | 15 | 15 | 15 |
| Abbreviation of ester group containing ethylene copolymer (D) | — | (LPDE) | (D13) | (EAA) |
| Type of unsaturated ester compound ethylene copolymer (D) | — | — | ethyl acrylate | — |
| Content of unsaturated ester compound copolymerized with (D) | wt. % | — | 45 | — |
| Melt flow rate of (D), 190° C., load: 2.16 kg | g/10 min. | (4) | 26 | (7) |
| Formulation amount of (D) | wt. % | 8 | 8 | 8 |
| [Properties of composition] | | | | |
| Unnotched Izod impact strength that welded area at 23° C. | kg · cm/cm | 11.2 | 11.8 | 11.1 |
| Notched Izod impact strength at ordinary area at 23° C. | kg · cm/cm | 28.5 | 24.5 | 18.2 |
| −30° C. | kg · cm/cm | 8.6 | 6.9 | 6.9 |

TABLE 5

| Item | unit | Example 11 | Comparison example 9 | Example 12 | Example 13 | Example 14 |
|---|---|---|---|---|---|---|
| [Formulation component] | | | | | | |
| Polyolefin (A) | — | propyrene-ethylene block copolymer | the same as left | the same as left | the same as left | the same as left |
| MFR of polyolefin (A) | g/10 min. | 2.5 | 2.5 | 1.1 | 1.1 | 1.1 |
| Ethylene component content of polyolefin (A) | wt. % | 11.8 | 11.8 | 9.6 | 9.6 | 9.6 |
| Formulation amount of polyolefin (A) | wt. % | 38.5 | 45.45 | 37.0 | 37.0 | 37.0 |
| Formulation amount of polyphenylene ether (B) | wt. % | 38.5 | 45.45 | 37.0 | 37.0 | 37.0 |
| Abbreviation of polymer (C) combining alkenyl aromatic compound polymerization chain and aliphatic hydrocarbon chain in the same molecule | | HSB-1 | — | HSB-1 | HSB-1 | HSB-1 |
| Dynamic shearing modulus of elasticity G' of (C) at 23° C. | dyn/cm$^2$ | $4 \times 10^9$ | — | $4 \times 10^9$ | $4 \times 10^9$ | $4 \times 10^9$ |
| Formulation amount of (C) | wt. % | 15 | — | 14.8 | 14.8 | 14.8 |
| Abbreviation of ester group containing ethylene copolymer (D) | — | (D14) | (D14) | (D15) | (D14) | (D16) |
| Type of unsaturated ester compound copolymerized with (D) (I) | — | vinyl acetate | vinyl acetate | glycidyl methacrylate | glycidyl methacrylate | glycidyl methacrylate |
| Content of unsaturated ester compound copolymerized with (D) (I) | wt. % | 7 | 7 | 10 | 10 | 16.4 |
| Type of unsaturated ester compound copolymerized with (D) (II) | — | glycidyl methacrylate | glycidyl methacrylate | — | vinyl acetate | ethyl acrylate |
| Content of unsaturated ester compound copolymerized with (D) (II) | wt. % | 10 | 10 | — | 7 | 12.3 |
| Total of unsaturated ester compound copolymerized with (D) | wt. % | 17 | 17 | 10 | 17 | 28.7 |
| Melt flow rate of (D), 190° C., load : 2.16 kg | g/10 min. | 3 | 3 | 2.5 | 3 | 10 |
| Formulation amount of (D) | wt. % | 8 | 9.1 | 11.2 | 11.2 | 11.2 |

TABLE 5-continued

| [Properties of composition] | | | | | |
|---|---|---|---|---|---|
| Unnotched Izod impact strength at welded area at 23° C. | kg · cm/cm | 27.8 | 4.0 | 52.8 | 44.3 | 39.4 |
| Notched Izod impact strength ordinary area at 23° C. | kg · cm/cm | 22.7 | 2.3 | 19.8 | 22.6 | 30.6 |
| −30° C. | kg · cm/cm | 9.7 | 1.3 | 8.5 | 8.8 | 9.8 |

| Item | unit | Comparison example 10 | Comparison example 11 | Comparison example 12 |
|---|---|---|---|---|
| [Formulation component] | | | | |
| Polyolefin (A) | — | the same as left | the same as left | the same as left |
| MFR of polyolefin (A) | g/10 min. | 1.1 | 1.1 | 1.1 |
| Ethylene component content of polyolefin (A) | wt. % | 9.6 | 9.6 | 9.6 |
| Formulation amount of polyolefin (A) | wt. % | 41.7 | 43.5 | 43.5 |
| Formulation amount of polyphenylene ether (B) | wt. % | 41.7 | 43.5 | 43.5 |
| Abbreviation of polymer (C) combining alkenyl aromatic compound polymerization chain and aliphatic hydrocarbon chain in the same molecule | | HSB-1 | — | — |
| Dynamic shearing modulus of elasticity G' of (C) at 23° C. | dyn/cm$^2$ | $4 \times 10^9$ | — | — |
| Formulation amount of (C) | wt. % | 16.6 | — | — |
| Abbreviation of ester group containing ethylene copolymer (D) | — | — | (D15) | (D14) |
| Type of unsaturated ester compound copolymerized with (D) (I) | — | — | glycidyl methacrylate | glycidyl methacrylate |
| Content of unsaturated ester compound copolymerized with (D) (I) | wt. % | — | 10 | 10 |
| Type of unsaturated ester compound copolymerized with (D) (II) | — | — | — | vinyl acetate |
| Content of unsaturated ester compound copolymerized with (D) (II) | wt. % | — | — | 7 |
| Total of unsaturated ester compound copolymerized with (D) | wt. % | — | 10 | 17 |
| Melt flow rate of (D), 190° C., load : 2.16 kg | g/10 min. | — | 2.5 | 3 |
| Formulation amount of (D) | wt. % | — | 13.0 | 13.0 |
| [Properties of composition] | | | | |
| Unnotched Izod impact strength at welded area at 23° C. | kg · cm/cm | 11.9 | 2.2 | 2.6 |
| Notched Izod impact strength ordinary area at 23° C. | kg · cm/cm | 21.1 | 2.1 | 2.7 |
| −30° C. | kg · cm/cm | 9.0 | 1.2 | 1.4 |

TABLE 6

| Item | unit | Example 15 | Example 16 | Comparison Example 13 | Comparison Example 14 |
|---|---|---|---|---|---|
| [Formulation component] | | | | | |
| Polyolefin (A) | — | polypropylene honopolymer | the same as left | the same as left | the same as left |
| MFR of polyolefin (A) | g/10 min. | 0.8 | 0.8 | 0.8 | 0.8 |
| Formulation amount of polyolefin (A) | wt. % | 37.0 | 35.7 | 41.7 | 43.5 |
| Formulation amount of polyphenylene ether (B) | wt. % | 37.0 | 35.7 | 41.7 | 43.5 |
| Abbreviation of polymer (C) combining alkenyl aromatic compound polymerization chain and aliphatic hydrocarbon chain in the same molecule. | | HSB-1 | HSB-1 | HSB-1 | — |
| Dynamic shearing modulus of elasticity G' of (C) at 23° C. | dyn/cm$^2$ | $4 \times 10^9$ | $4 \times 10^9$ | $4 \times 10^9$ | — |
| Formulation amount of (C) | wt. % | 14.8 | 14.3 | 16.6 | — |
| Abbreviation of ester group containing ethylene copolymer (D) | — | (D15) | (D15) | — | (D15) |
| Type of unsaturated ester compound copolymerized with (D) (I) | — | glycidyl methacrylate | glycidyl methacrylate | — | glycidyl methacrylate |
| Content of unsaturated ester compound copolymerized with (D) (I) | wt. % | 10 | 10 | — | 10 |
| Formulation amount of (D) | wt. % | 11.2 | 14.3 | — | 13.0 |
| [Properties of composition] | | | | | |
| Unnotched Izod impact strength at welded area at 23° C. | kg · cm/cm | 20.9 | 26.5 | 12.8 | 1.6 |
| Notched Izod impact strength at ordinary area at 23° C. | kg · cm/cm | 11.6 | 13.7 | 11.6 | 1.8 |

TABLE 6-continued

| Item | unit | Example 15 | Example 16 | Comparison Example 13 | Comparison Example 14 |
|---|---|---|---|---|---|
| −30° C. | kg · cm/cm | 4.8 | 4.6 | 5.2 | 1.1 |

TABLE 7

| Item | unit | Example 11 | Example 17 | Comparison Example 15 | Comparison Example 16 |
|---|---|---|---|---|---|
| [Formulation component] | | | | | |
| Polyolefin (A) | — | propyrene-ethylene block copolymer | the same as left | the same as left | the same as left |
| MFR of polyolefin (A) | g/10 min. | 2.5 | 2.5 | 2.5 | 2.5 |
| Ethylene component content of polyolefin (A) | wt. % | 11.8 | 11.8 | 11.8 | 11.8 |
| Formulation amount of polyolefin (A) | wt. % | 38.5 | 38.5 | 38.5 | 38.5 |
| Formulation amount of polyphenylene ether (B) | wt. % | 38.5 | 38.5 | 38.5 | 38.5 |
| Abbreviation of polymer (C) combining alkenyl aromatic compound polymerization chain and aliphatic hydrocarbon chain in the same molecule. | | HSB-1 | HSB-2 | G1652 | G1650 |
| Dynamic shearing modulus of elasticity G' of (C) at 23° C. | dyn/cm$^2$ | $4 \times 10^9$ | $3.5 \times 10^9$ | $1.2 \times 10^8$ | $1.5 \times 10^8$ |
| Formulation amount of (C) | wt. % | | | | |
| Abbreviation of ester group containing ethylene copolymer (D) | — | (D14) | (D14) | (D14) | (D14) |
| Type of unsaturated ester compound copolymerized with (D) (I) | — | glycidyl methacrylate | glycidyl methacrylate | glycidyl methacrylate | glycidyl methacrylate |
| Content of unsaturated ester compound copolymerized with (D) (I) | wt. % | 10 | 10 | 10 | 10 |
| Type of unsaturated ester compound copolymerized with (D) (II) | — | vinyl acetate | vinyl acetate | vinyl acetate | vinyl acetate |
| Content of unsaturated ester compound copolymerized with (D) (II) | wt. % | 7 | 7 | 7 | 7 |
| Total of unsaturated ester compound copolymerized with (D) | wt. % | 17 | 17 | 17 | 17 |
| Melt flow rate of (D), 190° C., load: 2.16 kg | g/10 min. | 3 | 3 | 3 | 3 |
| Formulation amount of (D) | wt. % | 8 | 8 | 8 | 8 |
| [Properties of composition] | | | | | |
| Unnotched Izod impact strength at welded area at 23° C. | kg · cm/cm | 27.8 | 27.5 | 18.5 | 17.8 |
| Notched Izod impact strength at ordinary area at 23° C. | kg · cm/cm | 22.7 | 23.1 | 27.2 | 28.4 |
| at −30° C. | kg · cm/cm | 9.7 | 9.6 | 10.2 | 10.5 |
| Flexural modulus at 23° C. | kg/cm$^2$ | 11200 | 10900 | 4900 | 6100 |

Illustration of Examples and Comparison examples

When comparing example 2 with comparison examples 1 and 2 in Table 3, as far as the resin compositions containing polyolefin (A) and polyphenylene ether resin (B) are concerned, a resin composition comprising polymer (C) which combines alkenyl aromatic composition polymerization chain (C1) and aliphatic hydrocarbon chain (C2) in the same molecule, along with ester group containing ethylene copolymer (D) has extremely higher weld strength comparing with that of a resin composition containing only either of said polymers (C) or (D), which clearly shows the effect of this invention. This is also the cases for the comparison of example 9 and comparison example 5 in Table 4, and comparison example 1 in Table 3; the comparison of example 11 and comparison example 9 in Table 5, and comparison example 1 in Table 3; and the comparison of examples 15, 16 and comparison examples 13 and 14 in Table 6.

Also when comparing examples 11 and 17 and comparison examples 15 and 16, a composition using a polymer (C) having a dynamic shearing modulus of elasticity at least $3 \times 10^8$ dyn/cm$^2$ has extremely high flexural modulus of elasticity compared with a composition using a polymer (C) having a dynamic shearing modulus of elasticity of less than $3 \times 10^8$ dyn/cm$^2$, which clearly shows the effect of this invention.

When comparing each example and comparison examples 3 and 4 in Table 3, a copolymer (D) containing unsaturated ester component of which copolymerization content ranges from 8 wt. % to 43 wt. % has extremely high weld strength compared with that containing unsaturated ester ompound of which copolymerization content is less than 8 wt. % or more than 43 wt. %; which clearly shows the effect of this invention. This is the same in comparison between each examples and comparison examples 6 and 7 in Table 4.

It is clear from the each example in Tables 3 and 4, and example 11 in Table 5 that as the unsaturated ester compounds constituting copolymer (D), a variety of said compounds within the range specified by this invention are effective, and also the combinations of these compounds are effective. Further, from the comparison of comparison Examples 6 with 8, the above described each example in which unsaturated monomer to be copolymerized with ethylene is an unsaturated ester has exceptionally high weld strength compared with a composition containing LDPE completely free from unsaturated monomer to be copolymerized with ethylene in place of copolymer (D), and with a composition containing EAA in which unsaturated monomer to be copolymerized with ethylene is not unsaturated ester but unsaturated carboxylic acid; which clearly shows the effect of this invention.

What is claimed is:

1. A resin composition comprising:
   (A) 30-77 wt. % of polyolefin comprising one or more polymers selected from the group consisting of homopolymers and copolymers of alpha-olefins selected from the group consisting of propylene, butene-1, pentene-1, hexene-1, 3-methylbutene-1, 4-methylpentene-1, heptene-1, octene-1, and copolymers composed of said alpha-olefins as the main component and not more than 20 wt. % of ethylene;
   (B) 20-60 wt. % of polyphenylene ether resin;
   (C) 2-50 wt. % of polymer having an alkenyl aromatic compound polymerization chain (C1) and an aliphatic hydrocarbon chain (C2) in the same molecule and having a dynamic shearing modulus of elasticity G' of at least $1 \times 10^9$ dyn/cm$^2$; and
   (D) 1-25 wt. % of ester group containing ethylene copolymer being a copolymer composed of 8 to 43 wt. % of unsaturated ester compound of general formula (I) or (II) and olefin which consists of ethylene alone or ethylene and a minor proportion of an olefin other than ethylene,

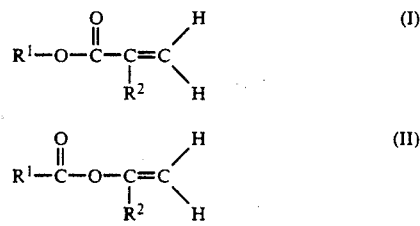

wherein R$^1$ represents an alkyl group of 1-50 carbons, an alkyl grouping which is optionally interrupted by oxygen or carbonyloxy, hydroxyalkyl, an acyclic hydrocarbon group, an oxacycloalkylalkyl group or an aromatic hydrocarbon group; R$^2$ represents hydrogen or methyl; and provided that in the said resin composition, polyolefin (A) forms the continuous phase and polyphenylene ether resin (B), polymer (C) and ester group containing ethylene copolymer (D) form dispersion phases.

2. A resin composition according to claim 1 wherein said composition comprises the following proportions,

| polyolefin (A) | 30-60 wt. % |
| polyphenylene ether (B) | 25-60 wt. % |
| polymer (C) | 6-30 wt. % and |
| ester group containing copolymer (D) | 2-20 wt. %. |

3. A resin composition according to claim 1 wherein said composition comprises the following formulating proportion,

| polyolefin (A) | 30-50 wt. % |
| polyphenylene ether (B) | 30-50 wt. % |
| polymer (C) | 10-20 wt. % |
| ester group containing copolymer (D) | 4-15 wt. %. |

4. A resin composition according to claim 1 wherein said polyolefin (A) is a homopolymer or a copolymer of propylene, butene-1, 3-methylbutene-1, and 4-methylpentene-1.

5. A resin composition according to claim 1 wherein said polyolefin (A) is a block copolymer or a random copolymer of propylene-ethylene, and exhibits crystallinity due to isotactic polypropylene chain.

6. A resin composition according to claim 5 wherein said polyolefin (A) is propylene-ethylene block copolymer containing 2-15 wt. % of ethylene.

7. A resin composition according to claim 1 wherein said polyolefin (A) is a propylene-ethylene-butene-1 block copolymer comprising 1-13 wt. % of ethylene and 0.5-10 wt. % of butene-1, and exhibits crystallinity due to isotactic polypropylene chain.

8. A resin composition according to claim 1 wherein said polymer (C) is obtained by hydrogenation of alkenyl aromatic compound and conjugated diene block copolymer.

9. A resin composition according to claim 8 wherein said alkenyl aromatic compound is styrene, p-methylstyrene or alpha-methylstyrene, and said conjugated diene is 1,3-butadiene or 2-methyl-1,3-butadiene.

10. A resin composition according to claim 1 wherein said ester group containing ethylene copolymer (D) is a copolymer composed of olefin containing ethylene as a principal component and one, two or more compounds of (metha)acrylic ester, vinylacetate, vinyl propionate and vinyl butyrate.

11. A resin composition according to claim 10 wherein said ester group containing ethylene copolymer (D) is a copolymer composed of olefin containing ethylene as a main component and unsaturated glycidyl ester.

12. A resin composition according to claim 10 wherein said ester group containing ethylene copolymer (D) is a tridimensional copolymer comprising,
   glycidyl methacrylate,
   vinyl acetate, and
   ethylene.

* * * * *

UNITED STATES PATENT AND TRADEMARK OFFICE
CERTIFICATE OF CORRECTION

PATENT NO. : 5,162,435
DATED : November 10, 1992
INVENTOR(S) : Nobuhiro Shibuya et al.

It is certified that error appears in the above-identified patent and that said Letters Patent is hereby corrected as shown below:

On the title page, Item [73], The assignee and the attorney, agent or firm have both been omitted. Please correct to read as follows:

Item [73] Assignee:

--Mitsubishi Petrochemical Co., Ltd., Tokyo; Toyota Jidosha Kabushiki Kaisha, Toyota-shi, both of Japan--

Attorney, Agent or Firm:

--Oblon, Spivak, McClelland, Maier & Neustadt--

Signed and Sealed this

Twenty-second Day of February, 1994

*Attest:*

BRUCE LEHMAN

*Attesting Officer*    *Commissioner of Patents and Trademarks*